(12) United States Patent
Tomatsu et al.

(10) Patent No.: US 12,098,269 B2
(45) Date of Patent: Sep. 24, 2024

(54) POLYOLEFIN-BASED RESIN FILM AND LAMINATE INCLUDING THE SAME

(71) Applicant: TOYOBO CO., LTD., Osaka (JP)

(72) Inventors: Wakato Tomatsu, Inuyama (JP); Tadashi Nishi, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 337 days.

(21) Appl. No.: 17/619,634

(22) PCT Filed: May 26, 2020

(86) PCT No.: PCT/JP2020/020689
§ 371 (c)(1),
(2) Date: Dec. 16, 2021

(87) PCT Pub. No.: WO2020/255643
PCT Pub. Date: Dec. 24, 2020

(65) Prior Publication Data
US 2022/0348752 A1    Nov. 3, 2022

(30) Foreign Application Priority Data

Jun. 20, 2019    (JP) ................................. 2019-114736

(51) Int. Cl.
| | | |
|---|---|---|
| *C08L 23/16* | (2006.01) | |
| *B32B 27/08* | (2006.01) | |
| *B32B 27/32* | (2006.01) | |
| *C08J 5/18* | (2006.01) | |

(52) U.S. Cl.
CPC .............. *C08L 23/16* (2013.01); *B32B 27/08* (2013.01); *B32B 27/32* (2013.01); *C08J 5/18* (2013.01); *B32B 2250/02* (2013.01); *B32B 2250/242* (2013.01); *B32B 2439/70* (2013.01); *C08J 2323/16* (2013.01); *C08J 2423/22* (2013.01)

(58) Field of Classification Search
CPC ................................. C08L 23/16; C08L 23/14
See application file for complete search history.

(56) References Cited

U.S. PATENT DOCUMENTS

| | | |
|---|---|---|
| 2010/0055429 A1 | 3/2010 | Lee et al. |
| 2012/0003412 A1 | 1/2012 | Yuno et al. |
| 2012/0094042 A1 | 4/2012 | Lee et al. |
| 2012/0251749 A1 | 10/2012 | Lee et al. |
| 2014/0272348 A1 | 9/2014 | Lee et al. |
| 2015/0028515 A1 | 1/2015 | Lee et al. |
| 2018/0205047 A1* | 7/2018 | Ogihara .............. H01M 50/121 |
| 2020/0392327 A1 | 12/2020 | Tomatsu et al. |
| 2023/0148197 A1 | 5/2023 | Tomatsu et al. |

FOREIGN PATENT DOCUMENTS

| | | |
|---|---|---|
| JP | S56-011249 A | 2/1981 |
| JP | 2002-003619 A | 1/2002 |
| JP | 2006-188600 A | 7/2006 |
| JP | 2012-500307 A | 1/2012 |
| JP | 5411935 B2 | 2/2014 |
| JP | 2014-141302 A | 8/2014 |
| JP | 5790497 B2 | 10/2015 |
| JP | 2016-032911 A | 3/2016 |
| JP | 2018-079583 | 5/2018 |
| WO | WO 2017/170244 A1 | 10/2017 |
| WO | WO 2019/065306 A1 | 4/2019 |
| WO | WO 2019/123944 A1 | 6/2019 |

OTHER PUBLICATIONS

Japanese Patent Office, International Search Report in International Patent Application No. PCT/JP2020/020689 (Aug. 4, 2020).
China National Intellectual Property Adminsitration, Office Action in Chinese Patent Application No. 202080043802.4 (Mar. 30, 2023).
Japanese Patent Office, International Search Report in International Patent Application No. PCT/JP2021/012698 (Jun. 15, 2021).
Intellectual Property India, Examination Report in Indian Patent Application No. 202147061428 (Dec. 11, 2023).
European Patent Office, Extended European Search Report in European Patent Application No. 21781394.8 (Mar. 27, 2024).

\* cited by examiner

*Primary Examiner* — Ramsey Zacharia
(74) *Attorney, Agent, or Firm* — Leydig, Voit & Mayer, Ltd.

(57) ABSTRACT

The invention provides a polyolefin-based resin film including a polyolefin-based resin composition that comprises a propylene-α olefin random copolymer, an ethylene-butene copolymeric elastomer, and a propylene-butene copolymeric elastomer, wherein (1) the polyolefin-based resin composition contains 2 to 9 parts by weight of the ethylene-butene copolymeric elastomer and 2 to 9 parts by weight of the propylene-butene copolymeric elastomer based on 100 parts by weight of the propylene-α olefin random copolymer; (2) the polyolefin-based resin film exhibits a thermal shrinkage rate after heating at 120° C. for 30 minutes of 25% or less in a direction in which the thermal shrinkage rate after heating at 120° C. for 30 minutes is larger between a longitudinal direction and a lateral direction of the polyolefin-based resin film; and (3) a planar orientation coefficient ΔP calculated from a refractive index of the polyolefin-based resin film is 0.0100-0.0145.

9 Claims, No Drawings

POLYOLEFIN-BASED RESIN FILM AND LAMINATE INCLUDING THE SAME

TECHNICAL FIELD

The present invention relates to a polyolefin-based resin film. The present invention also relates to a laminate including a biaxially oriented film made of at least one polymer selected from the group consisting of a polyamide resin film, a polyester resin film, and a polypropylene resin film.

BACKGROUND ART

Packaging bags are produced mainly by thermocompression bonding (hereinafter, heat-sealing) a peripheral portion of a laminate of a base film such as a polyamide resin film, a polyester resin film, or a polypropylene resin film with a polyolefin-based resin film at a temperature near a melting point of the polyolefin-based resin film with polyolefin-based resin film surfaces being in contact with each other.

In the field of food packaging bags, so-called semi-retort pouches, which are produced by filling packaging bags with foods and then sterilizing them by steam under pressure at about 100° C. and which are suitable for preserving foods for a long time, have been widely used.

In recent years, a demand for semi-retort pouches has increased similarly to retort pouches due to social backgrounds such as advancement of women into society, a trend toward nuclear families, and aging society, and at the same time, improvement of characteristics is further required.

For example, in recent years, such semi-retort pouches are often packed, transported, and sold at a store. Therefore, it is required that the semi-retort pouches are not broken easily even if they are dropped during the process, and particularly, the semi-retort pouches are not broken easily even if they are dropped under refrigeration.

In addition, when a food content is taken out from a packaging bag, especially from a semi-retort pouch, the packaging bag is often torn with fingers from an incision, a so-called notch, made in a peripheral sealed portion of the packaging bag. However, where a conventional laminate is used, a packaging bag cannot be torn in parallel with one edge, usually the horizontal direction, of the packaging bag and the packaging bag is obliquely torn, or a phenomenon in which the front-side laminate and the back-side laminate of the packaging bag are torn oppositely with respect to the vertical direction occurs, where the phenomenon is called "parting".

Accordingly, there is a possibility that a food content makes fingers or clothing dirty or when a content has been heated, the heated content causes a burn wound.

The reason why it is difficult to tear the packaging bag in parallel with one edge of the packaging bag is that a base film used for the laminate is distorted, that is, the molecular orientation axis direction of the base film is not parallel with one edge of the package.

Such a problem does not occur if the molecular orientation axis direction of the base film can be made the same with the tearing direction of the packaging bag. The molecular orientation axis direction of the lateral center of a produced wide stretched film is coincident with the machine direction of the film, so that a resulting packaging bag can be torn in parallel with one edge of the packaging bag. However, the molecular orientation axis direction at the lateral end of the film is inclined, so that the tearing direction of a resulting packaging bag is inclined. It is practically impossible to completely avoid the procurement of a base film using the lateral end of film. In addition, the degree of distortion tends to be larger than ever before due to an increase in the production speed or the width of a base film.

In such circumstances, attempts have been made to solve such a problem by designing a polyolefin-based resin film to be laminated on a base film.

Patent Document 1 discloses a technique of uniaxially stretching a sheet obtained by adding a polyethylene-based resin such as linear low-density polyethylene or high-pressure low-density polyethylene to a polypropylene-based resin. However, there were problems in film appearance and bag breaking resistance.

Patent Document 2 discloses a film obtained by uniaxially stretching 3.0 times a polyolefin-based resin sheet comprising a propylene-ethylene block copolymer and an ethylene-propylene copolymer in a seal layer. However, there are problems in haze, seal strength, tear strength, bag breaking resistance, and parting.

Patent Document 3 discloses a film obtained by uniaxially stretching a polyolefin-based resin sheet comprising a propylene-ethylene block copolymer, an ethylene-propylene copolymer, and a propylene-butene copolymer. However, there is a problem in visibility of contents.

In addition, Patent Document 4 discloses a technique of uniaxially stretching a polyolefin-based resin sheet containing a propylene-ethylene copolymer and a propylene-butene copolymer in a seal layer by a tenter method. However, there was a problem in bag breaking resistance.

Patent Document 5 discloses a technique of uniaxially stretching a polyolefin-based resin sheet comprising a propylene-ethylene copolymer in the longitudinal direction. However, there was a problem in bag breaking resistance.

Patent Document 6 discloses a film obtained by uniaxially stretching a polyolefin-based resin sheet containing a propylene-ethylene-butene random copolymer and an ethylene-butene copolymeric elastomer to 4 to 6 times. However, there is a problem that the thermal shrinkage rate is high.

RELATED ART DOCUMENTS

Patent Documents

Patent Document 1: JP-A-2002-003619
Patent Document 2: JP 5790497
Patent Document 3: JP 5411935
Patent Document 4: JP-A-2016-32911
Patent Document 5: JP-A-2018-79583
Patent Document 6: JP-A-2014-141302

SUMMARY OF THE INVENTION

Problems to be Solved by the Invention

An object of the present invention is to provide a polyolefin-based resin film being to be laminated on a base film having a large distortion of a molecular orientation axis such as a biaxially oriented polyamide-based resin film to afford a laminate, from which a packaging bag is obtained which is superior in transparency, sealability, bag-forming property, and bag breaking resistance and is easily torn without parting.

Solutions to the Problems

As a result of intensive studies to achieve such an object, the present inventors have found that by controlling the thermal shrinkage rate in the longitudinal direction and the plane orientation coefficient of a polyolefin-based resin film made of a polypropylene-based resin composition containing a propylene-α olefin random copolymer, an ethylene-butene copolymeric elastomer and a propylene-butene copolymeric elastomer in a specific ratio, a packaging bag produced from a laminate prepared by laminating the film with a base film having a large distortion of a molecular orientation axis, such as a biaxially oriented polyamide-based resin film, is superior in transparency, sealability, bag-forming property, and bag breaking resistance and can be easily torn without parting, thereby having accomplished the present invention.

That is, the present invention includes the following aspects.

[1] A polyolefin-based resin film including a polyolefin-based resin composition,
wherein the polyolefin-based resin composition includes a propylene-α olefin random copolymer, an ethylene-butene copolymeric elastomer, and a propylene-butene copolymeric elastomer, and the following 1) to 3) are satisfied:
1) the polyolefin-based resin composition contains 2 to 9 parts by weight of the ethylene-butene copolymeric elastomer and 2 to 9 parts by weight of the propylene-butene copolymeric elastomer based on 100 parts by weight of the propylene-α olefin random copolymer;
2) the polyolefin-based resin film exhibits a thermal shrinkage rate after heating at 120° C. for 30 minutes of 25% or less in a direction in which the thermal shrinkage rate after heating at 120° C. for 30 minutes is larger between a longitudinal direction and a lateral direction of the polyolefin-based resin film; and
3) a planar orientation coefficient ΔP calculated from a refractive index of the polyolefin-based resin film is 0.0100 or more and 0.0145 or less.

[2] The polyolefin-based resin film according to above [1], wherein at least one surface of the polyolefin-based resin film has a Martens hardness of 70 N/15 mm or more and an indentation creep rate (Cit) of 3.0% or less.

[3] The polyolefin-based resin film according to above [1] or [2], wherein the polyolefin-based resin film has a haze of 3% or more and 35% or less.

[4] The polyolefin-based resin film according to any one of above [1] to [3], wherein the polyolefin-based resin film has a tear strength of 0.5 N or less in a direction in which the thermal shrinkage rate after heating at 120° C. for 30 minutes is larger between the longitudinal direction and the lateral direction of the polyolefin-based resin film.

[5] The polyolefin-based resin film according to any one of above [1] to [4], wherein the polyolefin-based resin film has a piercing strength of 0.12 N/μm or more.

[6] The polyolefin-based resin film according to any one of above [1] to [5], wherein a layer located on at least one surface of the polyolefin-based resin film has an antiblocking agent concentration of 3000 ppm or less.

[7] A laminate including:
the polyolefin-based resin film according to any one of above [1] to [6]; and
a biaxially oriented film made of at least one polymer selected from the group consisting of a polyamide resin film, a polyester resin film, and a polypropylene resin film.

[8] The laminate according to above [7], wherein the laminate has a straight cuttability of 10 mm or less in a direction in which the thermal shrinkage rate after heating at 120° C. for 30 minutes is larger between a longitudinal direction and a lateral direction of the laminate, and has a tear strength of 1.0 N or less in a direction in which the thermal shrinkage rate after heating at 120° C. for 30 minutes is larger between the longitudinal direction and the lateral direction.

[9] A package including the laminate according to above [7] or [8].

Effects of the Invention

The polyolefin-based resin film of the present invention is suitable for providing a package that is superior in transparency, sealability, bag-forming property, and bag breaking resistance and can be easily torn without parting.

MODE FOR CARRYING OUT THE INVENTION

Hereinafter, the present invention will be described in detail.

The polyolefin-based resin film of the present invention includes a polyolefin-based resin composition, and the polyolefin-based resin composition includes a propylene-α olefin random copolymer, an ethylene-butene copolymeric elastomer, and a propylene-butene copolymeric elastomer.

(Propylene-α Olefin Random Copolymer)

In the present invention, examples of the propylene-α olefin random copolymer include a copolymer of propylene and at least one α-olefin having 4 to 20 carbon atoms other than propylene. As such an α-olefin monomer having 4 to 20 carbon atoms, ethylene, butene-1, pentene-1,4-methylpentene-1, hexene-1, octene-1, and the like can be used. Although not particularly limited, it is preferable to use ethylene from the viewpoint of stretchability and low shrinkage property. It is just required that at least one or more propylene-α olefin random copolymers are used, and two or more thereof may be used in combination as necessary. Particularly suitable are propylene-ethylene random copolymers.

The melting point of the propylene-α olefin random copolymer is preferably 125° C. or more, more preferably 130° C. or more, and further preferably 140° C. or more. When the melting point is 125° C. or more, straight cuttability is easily obtained.

The lower limit of the melt flow rate (MFR) of the propylene-α olefin random copolymer is preferably 0.6 g/10 min, more preferably 1.0 g/10 min, and further preferably 1.2 g/10 min. The uniformity of the film thickness may be impaired. The upper limit of the melt flow rate of the random copolymer is preferably 12.0 g/10 min, more preferably 9.0 g/10 min, and further preferably 8.0 g/10 min.

Specific examples thereof include a propylene-ethylene random copolymer (Sumitomo Noblen WF577PG manufactured by Sumitomo Chemical Co., Ltd., MFR at 230° C. and a load of 2.16 kg: 3.2 g/10 min, melting point: 142° C.), a propylene-ethylene-butene random copolymer (Sumitomo Noblen FL8115A manufactured by Sumitomo Chemical Co., Ltd., MFR at 230° C. and a load of 2.16 kg: 7.0 g/10 min, melting point: 148° C.), and a propylene-ethylene-butene random copolymer (Sumitomo Noblen FL6745A manufactured by Sumitomo Chemical Co., Ltd., MFR at 230° C. and a load of 2.16 kg: 6.0 g/10 min, melting point: 130° C.). Particularly suitable is a propylene-ethylene random copolymer in which a main monomer is propylene and a certain amount of ethylene is copolymerized. In the present description, any random copolymer is expressed by calling the monomers constituting the copolymer in the descending order of the monomer composition ratio.

The lower limit of the melting point of the propylene-α olefin random copolymer is not particularly limited, and it is preferably 120° C. and more preferably 125° C. When the melting point is less than the above, heat resistance is impaired, so that the inner surfaces of a bag may be fused with each other during retort treatment. The upper limit of the melting point of the propylene-α olefin random copolymer is not particularly limited, and it is preferably 155° C. and more preferably 150° C. When the melting point is equal to or more than the above, the temperature required for heat-sealing may be high.

(Copolymeric Elastomer)

In the present invention, a thermoplastic copolymeric elastomer mainly composed of a polyolefin may be added to the film of the present invention in order to enhance the resistance to bag breaking due to dropping of a packaging bag produced using the film.

As the copolymeric elastomer in the present invention, at least two or more copolymeric elastomers selected from olefin-based thermoplastic copolymeric elastomers that exhibit rubber-like elasticity at around normal temperature and olefin-based thermoplastic copolymeric elastomers that exhibit relatively high Shore hardness and good transparency among elastomers are preferably used in combination.

Owing to using these in combination, transparency, sealability, and bag breaking resistance are easily obtained even when tearability, parting, and bag-forming property are imparted.

Examples of the olefin-based thermoplastic copolymeric elastomer that exhibits rubber-like elasticity at around normal temperature include an amorphous or low crystalline ethylene-butene copolymeric elastomer obtained by copolymerizing ethylene and butene.

Examples of the olefin-based thermoplastic copolymeric elastomers that exhibit relatively high Shore hardness and good transparency among elastomers include a propylene-butene copolymeric elastomer, which is a crystalline elastomer obtained by copolymerizing propylene and butene.

In desirable embodiments, an ethylene-butene copolymeric elastomer and an ethylene-propylene copolymeric elastomer having a melt flow rate (MFR) at 230° C. under a load of 2.16 kg of 0.2 to 5.0 g/10 min, a density of 820 to 930 kg/m$^3$, and a molecular weight distribution (Mw/Mn) determined by GPC of 1.3 to 6.0 are used. When the melt flow rate (MFR) at a load of 2.16 kg is less than 0.2 g/10 min, uniform kneading becomes insufficient, so that fish eyes are likely to occur. When the melt flow rate exceeds 5.0 g/min, it is not preferable from the viewpoint of bag breaking resistance.

The limiting viscosity [η] of the ethylene-butene copolymeric elastomer and the propylene-butene copolymeric elastomer in the present invention of a propylene-butene copolymeric elastomer is preferably 1.0 to 5.0 and more preferably 1.2 to 3.0 from the viewpoint of maintaining heat-seal strength, maintaining impact strength, and bag drop impact strength.

When the limiting viscosity [η] is less than 1.0, fisheyes are likely to occur due to insufficient uniformity of kneading, and an intrinsic viscosity more than 5.0 is unpreferable in terms of bag breaking resistance and heat-seal strength.

Specific examples thereof include an ethylene-butene copolymeric elastomer having a density of 885 kg/m$^3$ and an MFR (230° C., 2.16 kg) of 1.4 g/10 min (TAFMER A1085S manufactured by Mitsui Chemicals, Inc.) and a propylene-butene copolymeric elastomer having a density of 900 kg/m$^3$ and an MFR (230° C., 2.16 kg) of 3 g/10 min (TAFMER XM7070 manufactured by Mitsui Chemicals, Inc.).

(Additives)

The polyolefin-based resin composition in the present invention may contain an anti-blocking agent. Even one kind of an anti-blocking agent is effective, but when two or more kinds of inorganic particles having different particle diameters and figures are blended, complicated projections are formed in the irregularities on the film surface, so that a higher anti-blocking effect may be exerted in some cases.

The anti-blocking agent to be added is not particularly limited, and inorganic particles such as spherical silica, irregular silica, zeolite, talc, mica, alumina, hydrotalcite, and aluminum borate, and organic particles such as polymethyl methacrylate and ultrahigh molecular weight polyethylene can be added.

In the case of a multilayer configuration having two layers or three or more layers, the anti-blocking agent may be added to all the layers. If there are irregularities on the surface of a layer on which a biaxially oriented film is to be laminated, this may result in defective appearance in lamination. Therefore, it is preferable to add the anti-blocking agent to only a layer on which films are heat-sealed to each other.

The layer on which a biaxially oriented film is to be laminated is called a laminate layer and the surface thereof is called a laminate surface. A layer on which films are heat-sealed is called a seal layer, and the surface thereof is called a seal surface.

The amount of the anti-blocking agent to be added is preferably 3000 ppm or less, more preferably 2500 ppm or less with respect to the polyolefin-based resin composition of the layer to be added. By adjusting the amount of the anti-blocking agent to 3000 ppm or less, falling off of the anti-blocking agent can be reduced.

An organic lubricant may be added to the polyolefin-based resin composition of the present invention. The lubricity and the anti-blocking effect of the laminated film are improved, so that the handleability of the film is improved. The reason for this is considered to be that the organic lubricant bleeds out and exists on the film surface, whereby a lubricant effect and a release effect are exhibited.

It is preferable to add an organic lubricant having a melting point of normal temperature or more. Examples of the organic lubricant include fatty acid amides and fatty acid esters.

Specific examples thereof include oleamide, erucamide, behenamide, ethylenebisoleamide, hexamethylenebisoleamide and ethylenebisoleamide. These may be used singly, but it is preferable to use two or more organic lubricants in combination because the lubricity and the anti-blocking effect can be maintained even in a severe environment.

As for the polyolefin-based resin composition of the present invention, an appropriate amount of an antioxidant, an antistatic agent, an antifogging agent, a neutralizing agent, a nucleating agent, a coloring agent, other additives, an inorganic filler, etc. may be blended in an arbitrary layer as necessary as long as the object of the present invention is not impaired.

For example, as an antioxidant, a phenol antioxidant and a phosphite antioxidant may be used in combination, or an antioxidant having a phenol-based skeleton and a phosphite-based skeleton in one molecule may be used alone. Examples of the neutralizing agent include calcium stearate.

(Polyolefin-Based Resin Composition)

The polyolefin-based resin composition in the present invention preferably comprises 2 to 9 parts by weight of an ethylene-butene copolymeric elastomer and 2 to 9 parts by weight of a propylene-butene copolymeric elastomer based on 100 parts by weight of the propylene-α olefin random copolymer.

When tearability is imparted by containing 2 parts by weight or more of the ethylene-butene copolymeric elastomer and 2 parts by weight or more of the propylene-butene copolymeric elastomer based on 100 parts by weight of the propylene-α olefin random copolymer, sealability and bag breaking resistance are easily obtained, and by containing 9 parts by weight or less of the ethylene-butene copolymeric elastomer and 9 parts by weight or less of the propylene-butene copolymeric elastomer, transparency, blocking resistance and bag-forming property are easily improved.

The polyolefin-based resin composition more preferably comprises 4 to 9 parts by weight of the ethylene-butene copolymeric elastomer and 4 to 9 parts by weight of the propylene-butene copolymeric elastomer based on 100 parts by weight of the propylene-α olefin random copolymer.

The polyolefin-based resin composition further preferably comprises 5 to 9 parts by weight of the ethylene-butene copolymeric elastomer and 5 to 9 parts by weight of the propylene-butene copolymeric elastomer based on 100 parts by weight of the propylene-α olefin random copolymer.

The polyolefin-based resin composition still further preferably comprises 6 to 9 parts by weight of the ethylene-butene copolymeric elastomer and 6 to 9 parts by weight of the propylene-butene copolymeric elastomer based on 100 parts by weight of the propylene-α olefin random copolymer.

(Polyolefin-Based Resin Film)

The polyolefin-based resin film of the present invention may have a single layer, or may have multiple layers, i.e., two layers or three or more layers. In the case of a three-layer configuration, by adding pellets obtained by recycling a semi-product obtained in a production process or a product film after production to the intermediate layer, the cost can be reduced without impairing heat-seal energy and bag breaking resistance, or by adding a propylene-α olefin random copolymer having a low melting point only to the seal layer and using a propylene-α olefin random copolymer having a high melting point as a main component for the intermediate layer and the laminate layer, in other words, by using resins slightly differing in composition in respective layers, the effect can be further enhanced.

(Method for Producing Polyolefin-Based Resin Film)

As a method for forming the polyolefin-based resin film of the present invention, for example, an inflation method and a T-die method can be used, and the T-die method is preferred from the viewpoint of enhancing transparency or ease of drafting. The inflation method uses air as a cooling medium, whereas the T-die method uses a cooling roll and it therefore is a production method advantageous for increasing a cooling speed. By increasing the cooling rate, crystallization of an unstretched sheet can be suppressed, so that stretching by a roll is made advantageous in a subsequent step. For these reasons, the T-die method is preferable.

The lower limit of the temperature of a cooling roll on which a molten raw material is cast to afford a non-oriented sheet is preferably 15° C. and more preferably 20° C. When the temperature is less than the above, dew condensation may occur on the cooling roll, leading to insufficient adhesion. The upper limit of the cooling roll temperature is preferably 60° C. and more preferably 50° C. When the temperature exceeds the above, transparency may deteriorate.

A method for stretching a non-oriented sheet is not particularly limited, and for example, an inflation method, a tenter lateral stretching method, and a roll longitudinal stretching method can be used, and the roll longitudinal stretching method is preferable from the viewpoint of ease of controlling orientation.

The term "longitudinal stretching" as used herein means a direction in which a film flows from casting of a raw material resin composition to a step of winding a stretched film, and the term "lateral direction" means a direction perpendicular to the flow direction.

By stretching a non-oriented sheet, straight cuttability is exhibited. This is because the structure of molecular chains is regularly arranged in the stretching direction.

The lower limit of the stretch ratio is preferably 3.3 times. When the stretch ratio is smaller than this, the yield strength is reduced, so that the tear strength may be increased or the straight cuttability may be deteriorated. The stretch ratio is more preferably 3.5 times, and further preferably 3.8 times.

The upper limit of the stretch ratio is preferably 5.5 times. When the stretch ratio is larger than this, orientation excessively proceeds, a seal energy decreases, and bag breaking resistance after dropping may deteriorate. The stretch ratio is more preferably 5.0 times, and further preferably 4.7 times.

The lower limit of the stretching roll temperature is not particularly limited, and it is preferably 80° C. When the stretching roll temperature is lower than this, a stretch stress applied to the film increases, and the film may fluctuate in thickness. The lower limit of the annealing treatment temperature is more preferably 90° C.

The upper limit of the stretching roll temperature is not particularly limited, and it is preferably 140° C. When the stretching roll temperature is higher than this, a stretch stress on the film may be decreased and thus not only a tearing strength of the film may be reduced but also the film may be welded to the stretching roll and the production of the film may be difficult. The upper limit of the stretching roll temperature is more preferably 130° C., further preferably 125° C., and particularly preferably 115° C.

It is preferable that the sheet temperature of the unstretched sheet has been raised by bringing the sheet into contact with a preheating roll prior to the introduction into the stretching step.

The lower limit of the preheating roll temperature in stretching a non-oriented sheet is not particularly limited, and it is preferably 80° C. and more preferably 90° C. If the preheating roll temperature is less than the above lower limit, there is a possibility that stretch stress increases, so that variation in thickness occurs. The upper limit of the preheating roll temperature is not particularly limited, and it is preferably 140° C., more preferably 130° C., and further preferably 125° C. When the preheating roll temperature is the above upper limit or more, the thermal shrinkage rate and the retort shrinkage rate may increase. This is because thermal crystallization before stretching can be prevented to reduce a residual stress after stretching.

The polyolefin-based resin film subjected to the longitudinal stretching step is preferably subjected to annealing treatment in order to suppress thermal shrinkage. Examples of a method for the annealing treatment include a roll heating method and a tenter method, but the roll heating method is preferred from the viewpoint of simplicity of equipment and ease of maintenance. By performing the annealing treatment to reduce the internal stress of the film, thermal shrinkage of the film can be suppressed and tear strength can also be reduced. Therefore, unlike a conventional method, neither thermal shrinkage rate nor heat-seal strength is sacrificed in order to enhance the tearability as compared with the case where the stretch ratio is simply increased. However, characteristics other than the thermal shrinkage rate and the heat-seal strength may be adversely affected.

However, by using the ethylene-butene copolymeric elastomer and the propylene-butene copolymeric elastomer in combination, adverse effects on bag breaking resistance and the like can be suppressed.

The lower limit of the annealing treatment temperature is not particularly limited, and it is preferably 80° C. When the annealing treatment temperature is 80° C. or more, the thermal shrinkage rate does not increase easily, the tear strength does not increase easily, and the finish quality of a packaging bag after bag making or retorting may deteriorate. The lower limit of the annealing treatment temperature is more preferably 100° C., and particularly preferably 110° C.

The upper limit of the annealing treatment temperature is preferably 140° C. When the annealing treatment temperature is higher, the thermal shrinkage rate is likely to decrease, but when the annealing treatment temperature is 140° C. or less, film thickness does not vary easily, the film is not easily fused to manufacturing equipment, and transparency, heat sealability, and bag breaking resistance do not decrease easily. The upper limit of the annealing treatment temperature is more preferably 135° C., and particularly preferably 130° C.

In the annealing step, a relaxation step can be provided by reducing the rotation speed of the roll or sequentially reducing the conveyance speed of the film. By providing the relaxation step, the thermal shrinkage rate of the produced polyolefin-based resin film can be further reduced, and the heat-sealing strength can also be increased.

The upper limit of the relaxation rate in the relaxation step is preferably 10% and more preferably 8%. When the relaxation rate is 10% or less, the film under conveyance is less likely to sag, and winding in the process is less likely to occur. The lower limit of the relaxation rate is preferably 1% and more preferably 3%. When the relaxation rate is 1% or more, the thermal shrinkage rate of the polyolefin-based resin film is unlikely to increase.

In the present invention, it is preferable to activate the surface on the side where the polyolefin-based resin film described above and a biaxially oriented film made of another material are laminated by corona treatment or the like. Accordingly, the lamination strength with the base film is improved.

(Film Thickness)

The lower limit of the thickness of the polyolefin-based resin film of the present invention is preferably 20 μm, more preferably 30 μm, further preferably 40 μm, and particularly preferably 50 μm. When the thickness is 20 μm or more, the film becomes relatively thick with respect to the thickness of the base film, so that the straight cuttability as a laminate does not deteriorate easily, the stiffness of the film is obtained and it is easy to process the film, impact resistance is easily obtained, and bag breaking resistance is easily obtained. The upper limit of the film thickness is preferably 150 μm, more preferably 100 μm, and further preferably 80 μm. When the thickness is 150 μm or less, the stiffness of the film is not excessively strong and it is easy to process the film, and it is easy to produce a suitable package.

The characteristics of the polyolefin-based resin film will be described.

(Haze)

The lower limit of the haze of the polyolefin-based resin film of the present invention is preferably 3.0% and more preferably 8.0%. When the haze is 3.0% or more, a film surface does not have extremely few irregularities, so that inner surface blocking of a package does not occur easily. The upper limit of the haze is preferably 35.0%, more preferably 30.0%, and further preferably 26.0%. When the haze is 35.0% or less, the visibility of a package is easily obtained.

(Thermal Shrinkage Rate)

The polyolefin-based resin film of the present invention has an upper limit of a thermal shrinkage rate after heating at 120° C. for 30 minutes of 25% in a direction in which the thermal shrinkage rate after heating at 120° C. for 30 minutes is larger between a longitudinal direction and a lateral direction of the polyolefin-based resin film. When the thermal shrinkage rate is 25% or less, semi-retort shrinkage of a package during heat sealing is reduced, so that the appearance of the package is not impaired easily. The thermal shrinkage rate is preferably 20%, and more preferably 17%.

The polyolefin-based resin film of the present invention has a lower limit of a thermal shrinkage rate after heating at 120° C. for 30 minutes of 2% in a direction in which the thermal shrinkage rate after heating at 120° C. for 30 minutes is larger between a longitudinal direction and a lateral direction of the polyolefin-based resin film. When the thermal shrinkage rate is 2% or more, it is not necessary to significantly increase the annealing temperature and the annealing time, so that the appearance does not deteriorate easily.

The polyolefin-based resin film of the present invention has an upper limit of a thermal shrinkage rate after heating at 120° C. for 30 minutes of 1% in a direction in which the thermal shrinkage rate after heating at 120° C. for 30 minutes is smaller between a longitudinal direction and a lateral direction of the polyolefin-based resin film. When the thermal shrinkage rate is 1% or less, the tear strength in the direction in which the thermal shrinkage rate is larger increases, or the straight cuttability is poor. The upper limit of the thermal shrinkage rate is preferably 0.5%. The polyolefin-based resin film of the present invention has a lower limit of a thermal shrinkage rate after heating at 120° C. for 30 minutes of −5% in a direction in which the thermal shrinkage rate after heating at 120° C. for 30 minutes is smaller between a longitudinal direction and a lateral direction of the polyolefin-based resin film. When the thermal shrinkage rate is −5% or more, elongation does not occur easily in the film in a heat-sealing step, so that the appearance of a package does not deteriorate easily. The lower limit of a thermal shrinkage rate is preferably −3%.

(Piercing Strength)

The lower limit of the piercing strength per 1 μm of the polyolefin-based resin film of the present invention is preferably 0.05 N/μm and more preferably 0.1 N/μm. When the piercing strength is 0.05 N/μm or more, pinholes are not generated easily when a protrusion comes into contact with the package. The upper limit of the piercing strength is preferably 1.0 N/μm, more preferably 0.8 N/μm, and further preferably 0.5 N/μm. When the piercing strength is 1.0 N/μm or less, the stiffness is not excessively strong, it becomes easy to handle the film or a laminate produced therefrom.

(Orientation Coefficient in Longitudinal Direction)

The orientation coefficient $\Delta Nx$ in the longitudinal direction used in the present invention can be calculated from Formula 1.

$$\Delta Nx = Nx - [(Ny + Nz)/2] \quad \text{(Formula 1)}$$

Nx: Refractive index in longitudinal direction
Ny: Refractive index in a direction perpendicular to the longitudinal direction
Nz: Refractive index in plane direction The lower limit of the orientation coefficient ΔNx in the longitudinal direction of the polyolefin-based resin film of the present invention is preferably 0.010, more preferably 0.015, and further preferably 0.020. When the orientation coefficient is 0.010 or more, the straight cuttability of a package is easily obtained. The upper limit of the orientation coefficient ΔNx in the longitudinal direction is preferably 0.0270 and more preferably 0.026. When the orientation coefficient is 0.0270 or less, the seal strength hardly decreases.

(Planar Orientation Coefficient)

The planar orientation coefficient ΔP used in the present invention can be calculated from a refractive index. The orientation coefficient in the plane direction can be calculated from Formula 2.

$$\Delta P=[(Nx+Ny)/2]-Nz \quad \text{(Formula 2)}$$

Nx: Refractive index in longitudinal direction
Ny: Refractive index in a direction perpendicular to the longitudinal direction
Nz: Refractive index in plane direction The lower limit of the orientation coefficient ΔP in the plane direction of the polyolefin-based resin film of the present invention is preferably 0.0050 and more preferably 0.0100. When the planar orientation coefficient is 0.0050 or more, the piercing strength of a package is easily obtained. The upper limit of the planar orientation coefficient ΔP is preferably 0.0145, more preferably 0.0140, and further preferably 0.0130. When the planar orientation coefficient is 0.0145 or less, the seal strength does not decrease easily.

(Melting Point of Film)

The lower limit of the melting point of the polyolefin-based resin film of the present invention is not particularly limited, and it is preferably 120° C., more preferably 130° C., and further preferably the melting point is 140° C. or more. When the melting point is 120° C. or more, heat resistance to retort treatment is easily obtained. The upper limit of the melting point is preferably 150° C. and more preferably 145° C. When the melting point is 150° C. or less, low-temperature sealability is easily obtained.

(Bending Pinhole Resistance)

The flex resistance can be measured by Gelbo pinhole evaluation. The number of pinholes after the laminate of the present invention is bent 1000 times at 1° C. is preferably 10, more preferably 8, further preferably 5, and particularly preferably 3. When the number of pinholes is 10 or less, pinholes are not formed easily by bending impact when the package is transported.

(Tear Strength)

The polyolefin-based resin film of the present invention preferably has an upper limit of a tear strength of 0.50 N in a direction in which the thermal shrinkage rate after heating at 120° C. for 30 minutes is larger between a longitudinal direction and a lateral direction of the polyolefin-based resin film. When the tear strength is 0.50 N or less, the laminate film is easily torn.

The polyolefin-based resin film of the present invention preferably has a lower limit of a tear strength of 0.1 N in a direction in which the thermal shrinkage rate after heating at 120° C. for 30 minutes is larger between a longitudinal direction and a lateral direction of the polyolefin-based resin film. When the tear strength is 0.1 N or more, the bag breaking resistance is easily obtained. The lower limit of the tear strength is more preferably 0.2 N.

(Accelerated Blocking Strength)

The lower limit of the accelerated blocking strength of the polyolefin-based resin film of the present invention is preferably 20 mN/70 mm and more preferably 30 mN/70 mm. When the accelerated blocking strength is 20 mN/7 mm or more, the stiffness of the film is easily obtained. The upper limit of the accelerated blocking strength is preferably 600 mN/70 mm, more preferably 500 mN/70 mm, and further preferably 400 mN/70 mm. When the accelerated blocking strength is 600 mN/70 mm or less, blocking does not occur easily on the inner surface of a package.

(Martens Hardness)

The lower limit of the Martens hardness of at least one surface, particularly the sealing surface, of the polyolefin-based resin film of the present invention is preferably 70 N/mm$^2$ and more preferably 75 N/mm$^2$. When the Martens hardness is 70 N/mm$^2$ or more, blocking does not occur easily on the inner surface of a package. The upper limit of the Martens hardness is preferably 140 N/mm$^2$, more preferably 130 N/mm$^2$, and further preferably 120 N/mm. When the Martens hardness is 140 N/mm$^2$ or less, the film is not excessively hard, and bending pinhole resistance is easily obtained.

(Indentation Creep Rate)

The lower limit of the indentation creep rate (cit) of the seal surface of the polyolefin-based resin film of the present invention is preferably 1.8% and more preferably 2.0%. When the indentation creep rate is 1.8% or more, the film does not become hard, and bending pinhole resistance is easily obtained. The upper limit of the indentation creep rate (cit) is preferably 3.0% and more preferably 2.8%. When the indentation creep rate is 3.0% or less, blocking hardly occurs on the inner surface of a package.

(Wet Tension)

The lower limit of the wet tension of the surface of the polyolefin-based resin film of the present invention to be laminated on at least one base film selected from the group consisting of a polyamide resin film, a polyester resin film, and a polypropylene resin film is preferably 30 mN/m, and more preferably 35 mN/m. When the wet tension is 30 mN/m or more, the lamination strength hardly decreases. The upper limit of the wet tension is preferably 55 mN/m and more preferably 50 mN/m. When the wet tension is 55 mN/m or less, blocking between films hardly occurs when the polyolefin-based resin film is wound into a roll.

(Configuration and Production Method of Laminate)

The laminate including the polyolefin-based resin film of the present invention is a laminate including at least one film selected from the group consisting of a polyamide resin film, a polyester resin film, and a polypropylene resin film, and the polyolefin-based resin film used as a sealant. The laminate also may be configured by using a base film provided with coating or vapor deposition processing or by further laminating an aluminum foil as conventionally technologies in order to give an adhesive property and a barrier property.

Specific examples of the configuration include biaxially-stretched PET film/aluminum foil/sealant, biaxially-stretched PET film/biaxially-stretched nylon film/sealant, biaxially-stretched nylon film/sealant, biaxially-stretched polypropylene film/sealant, and biaxially-stretched PET film/biaxially-stretched nylon film/aluminum foil/sealant.

Among them, when a biaxially-stretched nylon film is laminated on a conventional sealant, the straight cuttability of a resulting laminate is significantly poor. When the polyolefin-based resin film of the present invention is used as a sealant, a laminate having superior straight cuttability can be produced whichever of the configuration is selected.

As a lamination method, a known method such as a dry lamination method or an extrusion lamination method can be used, and a laminate having good straight cuttability can be produced by any lamination method.

The characteristics of the laminate will be described.

(Piercing Strength)

The lower limit of the piercing strength of the laminate of the present invention before retorting is preferably 10 N, more preferably 15 N, and further preferably 18 N. When the piercing strength is 10 N or more, pinholes are less likely to be generated when a protrusion comes into contact with the package. The upper limit of the piercing strength is preferably 45.0 N, more preferably 30.0 N, and further preferably 25.0 N. When the piercing strength is 45.0 N or less, the stiffness of the laminate is not excessively strong and it becomes easy to handle the laminate.

(Tear Strength)

The laminate of the present invention preferably has an upper limit of a tear strength of 1.0 N in a direction in which the thermal shrinkage rate after heating at 120° C. for 30 minutes is larger between a longitudinal direction and a lateral direction of the polyolefin-based resin film. When the tear strength is 1.0 N or less, the laminate is easily torn. The upper limit of the tear strength is more preferably 0.80 N and further preferably 0.7 N.

(Straight Cuttability)

The upper limit of the straight cuttability of the laminate of the present invention is preferably 10 mm, more preferably 9 mm, further preferably 7 mm, and particularly preferably 3 mm. When the straight cuttability is 10 mm or less, a package is resistant to parting.

(Parting)

The upper limit of the parting of the laminate of the present invention is preferably 10 mm, more preferably 8 mm, and further preferably 5 mm. When the parting is 10 mm or less, the contents are not spilled easily when the package is torn.

(Finished Quality of Bag)

If a film thermally shrinks in a process of producing a package while heat-sealing a laminate, the portion where the film shrinks may wrinkle or the dimensions of a package may be wrong. As for the finished quality when a four-side sealed bag is manufactured, it is preferable that wrinkles are not generated in the sealed portion, and it is more preferable that there are no waves in the sealed portion. When wrinkles are generated in the sealed portion, the appearance of the package may be impaired.

(Heat-Seal Strength)

The lower limit of the heat-seal strength of the laminate of the present invention before retorting is preferably 20 N/15 mm, more preferably 35 N/15 mm, and further preferably 40 N/15 mm. When the heat-seal strength is 20 N/15 mm or more, bag breaking resistance is easily obtained. A heat-seal strength of 60 N/15 mm is sufficient.

The upper limit of the heat-seal strength per 1 µm is preferably 1.8 N/15 mm µm, and more preferably 1.5 N/15 mm µm. When the heat-seal strength per 1 µm is 1.8 N/15 mm µm or less, an additive such as a resin having high impact resistance or a filler is not required, and the cost is hardly increased. The lower limit of the heat-seal strength per 1 µm is not particularly limited, and it is preferably 0.65 N/15 mm µm, more preferably 0.7 N/15 mm µm, and further preferably 0.75 N/15 mm µm. When the heat-seal strength per 1 µm is 0.65 N/15 mm µm or more, the seal is not peeled off easily during transportation, and the contents do not leak easily.

(Package)

The laminate provided to enclose contents such as foodstuffs to protect the contents from dirt or gas derived from nature is referred to as a package. The package is produced by, for example, cutting the laminate described above and bonding inner surfaces of the laminate to each other by a hot heat-seal bar or ultrasonic waves to form a bag. For example, a four-side sealed bag is widely used which is produced by stacking two rectangular sheets of the laminate in such a manner that their sealant-side surfaces face to each other and heat-sealing four sides. The contents may be foodstuffs, or may be other products such as daily goods, and the shape of the package may be a shape other than a rectangular shape such as a standing pouch or a pillow package.

A package that can withstand heat for heat sterilization by hot water having a temperature of 100° C. or more achieved due to boiling point elevation by pressurization or the like is referred to as a package for retorting. A film intended to provide the package is referred to as a film for retorting.

(Bag Breaking Resistance)

A four-side sealed bag fabricated from the laminate of the present invention is dropped, the dropping is repeated until the bag is broken, and the number of repetition of the dropping is counted. The number of the dropping attained when the ratio of the number of remaining bags without being broken reaches 50% is practically preferably 5 or more, and more preferably 10 or more. The evaluation was performed as follows.

⊚: The number of dropping when the residual ratio reaches 50% is 13 or more.

○: The number of dropping when the residual ratio reaches 50% is 10 or more and 12 or less.

Δ: The number of dropping when the residual ratio reaches 50% is 5 or more and 9 or less.

x: The number of dropping when the residual ratio reaches 50% is 4 or less.

EXAMPLES

Hereinafter, the present invention will be described in detail with reference to Examples, but the present invention is not limited thereto. The characteristics obtained in the Examples were measured and evaluated by the following methods. In the evaluation, the flow direction of the film in the film formation step was defined as the longitudinal direction, and the direction perpendicular to the flow direction was defined as the lateral direction.

(1) Resin Density

The density was evaluated according to the D method (density gradient tube method) of JIS K7112:1999.

Measurement was performed at N=3, and the average value was calculated.

(2) Melt Flow Rate (MFR)

Measurement was performed at 230° C. under a load of 2.16 kg according to JIS K-7210-1. The measurement was performed at N=3, and the average value was calculated.

(3) Haze

The haze was measured according to JIS K 7136. For a polyolefin-based resin film before lamination, the measurement was performed at N=3, and the average value was calculated.

(4) Tear Strength

A strip sample having a longitudinal direction length of 150 mm and a direction length perpendicular to the longitudinal direction of 60 mm was cut out from the film and the laminate. An incision of 30 mm was made from the center of one short side of the sample along the longitudinal direction. The sample was conditioned in an atmosphere of a temperature of 23° C. and a relative humidity of 50%, and then the measurement was performed.

The ranges 10 mm away from the right and left short sides of the cut sample were gripped with grippers, respectively, and the grippers were attached to an Autograph AG-I manufactured by Shimadzu Corporation with the distance between the two grippers adjusted to 40 mm, and the grippers were carefully tightened such that the long side of the sample became parallel to a virtual center line between the two grippers.

The test speed was adjusted to 200 mm/min, and the testing machine was started. The tear strength was measured until the cut reached the other short side of the sample, and the average value of the tear strengths at the cut points of 25 mm, 50 mm, 75 mm and 100 mm was calculated.

With the inner surface of the wound film placed forward, the measurement was performed at N=3 for both when the section on the right side was gripped with the upper gripper and when the section on the left side was gripped with the upper gripper, and the average values were calculated for both the cases, respectively. The larger value among the measurement results of the right side and the left side was adopted as a tear strength.

Similarly, with the polyolefin-based resin film of the laminate placed forward, the measurement was performed at N=3 for both when the section on the right side was gripped with the upper gripper and when the section on the left side was gripped with the upper gripper, and the average values were calculated for both the cases, respectively. The larger value among the measurement results of the right side and the left side was adopted as a tear strength.

(5) Piercing Strength

The piercing strength of a polyolefin-based resin film and a laminate was measured at 23° C. in accordance with "2. Strength test method" of "Specifications and Standards for Food, Food Additives, etc. III: Apparatus and containers and packaging" (Ministry of Health and Welfare Notification No. 20, 1982) in Food Sanitation Act. The film was pierced with a needle having a tip diameter of 0.7 mm at a piercing speed of 50 mm/min, and the strength when the needle penetrated the film was measured. The measured value was divided by the thickness of the film, and a piercing strength per 1 μm of the film [N/μm] was thereby calculated. The measurement was performed at N=3, and the average value was calculated.

(6) Orientation Coefficient in Longitudinal Direction and Planar Orientation Coefficient The density was evaluated in accordance with the test methods for refractive index of chemical products of JIS K 0062: 1999. The measurement was performed at N=3, and the average value was calculated. The orientation coefficient $\Delta Nx$ in the longitudinal direction was calculated by Formula 1, and the orientation coefficient $\Delta P$ in the planar direction was calculated by Formula 2.

$$\Delta Nx = Nx - [(Ny+Nz)/2] \quad \text{(Formula 1)}$$

$$\Delta P = [(Nx+Ny)/2] - Nz \quad \text{(Formula 2)}$$

(7) Melting Point

The temperature of the maximum melting peak of the DSC curve of a polyolefin-based resin film produced using Shimadzu Differential Scanning Calorimeter DSC-60 manufactured by Shimadzu Corporation was defined as a melting point. The starting temperature was 30° C., the temperature raising rate was 5° C./min, and the ending temperature was 180° C. The measurement was performed at N=3, and the average value was calculated.

(8) Bending Pinhole Resistance

A laminate with a polyolefin-based resin film laminated was cut out into a size of 280 mm in the longitudinal direction and 260 mm in the lateral direction. The laminate was formed into a cylindrical shape having a diameter of 89 mm and a height of 260 mm with the polyolefin-based resin film facing inward, and the laminate was then fixed with a cellophane tape. The sample was attached to a Gelbo Flex Tester with a chamber manufactured by Tester Sangyo Co., Ltd., and a bending load of 1° C., 1000 times was applied. The sample was removed and the number of pinholes was counted. The measurement was performed at N=3, and the average value was calculated.

(9) Thermal Shrinkage Rate

A film before lamination was cut into a 120 mm square. Gauge lines were drawn at an interval of 100 mm in each of the longitudinal direction and the lateral direction. The sample was suspended in an oven maintained at 120° C., and was subjected to heat treatment for 30 minutes. A distance between the gauge lines was measured, and a thermal shrinkage rate was calculated according to the following formula. The measurement was performed at N=3, and the average value was calculated.

Thermal shrinkage rate=(gauge length before heat treatment−gauge length after heat treatment)/ gauge length before heat treatment×100(%) (Formula 3)

(10) Accelerated Blocking Strength

A polyolefin-based resin film was cut out into a size of 148 mm in the longitudinal direction and 105 mm in the lateral direction. The polyolefin-based resin film was superposed with its seal surfaces facing each other. The polyolefin-based resin film was preheated in an environment of 50° C. for 30 minutes, and then sandwiched between 7.0 cm square aluminum plates held at 50° C. The aluminum plates and the sample were pressed under conditions of 50° C. and 100 kN using a Mini-Test Press lVP-SCH manufactured by Toyo Seiki Seisaku-sho, Ltd., and were held for 15 minutes. The sample taken out was cut into 70 mm long in a lateral direction. The superposed sample was opened by 30 mm, and a metal rod having a diameter of 3 mm was inserted so as to be parallel to the lateral direction. The sample was mounted on an Autograph AG-I manufactured by Shimadzu Corporation, and the weight when the metal rod was moved under the condition of 200 mm/min in the longitudinal direction was measured. The measurement was performed at N=3, and the average value was calculated.

(11) Martens Hardness, Indentation Creep Rate

A polyolefin-based resin film was cut into a 10 mm square, placed on a cover glass to which an adhesive had been applied with the measurement surface facing upward, and dried for 24 hours. Martens hardness and an indentation creep rate were measured using a Shimadzu Dynamic Ultra Micro Hardness Tester DUH-211 manufactured by Shimadzu Corporation. The measurement mode was a loading-unloading test, a test force of 0.5 mN, a loading speed of 6.0 mN/sec, and a load holding time of 2 sec, and a Triangular 15 was used as an indenter. The measurement was performed at N=10, and the average value was calculated.

(12) Straight Cuttability

Straight cuttability refers to performance of a laminate of tearing straight in parallel to one direction when the laminate is torn. The measurement was performed by the following method. In Examples and Comparative Examples, since straight cuttability in a stretching direction is exhibited, measurement in the stretching direction was performed.

A laminate was cut into a strip of 150 mm in the stretching direction and 60 mm in the direction perpendicular to the stretching direction, and an incision of 30 mm was made along the measurement direction from the center of a short side. The sample was torn according to JIS K 7128-1: 1998. When the laminate was torn 120 mm, excluding 30 mm of the incision, in the stretching direction, the distance moved in the direction perpendicular to the stretching direction was measured, and the absolute value thereof was recorded. The measurement was performed at N=3 for both when the section on the right side was gripped with the upper gripper and when the section on the left side was gripped with the upper gripper, and the average values were calculated for both the cases, respectively. The larger value among the measurement results of the right side and the left side was adopted.

(13) Parting

The heat-seal films of two laminates were faced with each other and heat-sealed to prepare a four-side sealed bag having an inside dimension of 120 mm in the longitudinal direction and 170 mm in the width direction. A notch was formed at an edge of the four-side sealed bag, and the bag was torn with fingers in the stretching direction. The bag was cut to the opposite edge, and a gap between the tear lines of the front-side film and the back-side film of the bag was measured. The measurement was performed at N=3 in each of a direction in which the right-hand side was toward the front and a direction in which the left-hand side was toward the front, and average values were calculated, respectively. The larger one of the measured values was adopted.

(14) Finished Quality of Bag

The polyolefin-based resin film sides of laminates were superimposed on each other, and then heat-sealed at a pressure of 0.2 MPa and a heat-seal temperature of 220° C. for 1 second using a seal bar having a width of 10 mm to form a four-side sealed bag having inside dimensions of 120 mm in the longitudinal direction and 170 mm in the lateral direction. The finished condition of the four-side sealed bag was visually checked.
- ○: There was no distortion in the vicinity of the heat-sealed portions, and the bag was perfectly rectangular.
- Δ: There was a little distortion in the vicinity of the heat-sealed portions
- x: There was a large distortion in the vicinity of the heat-sealed portions, and the edges of the bag were wavy.

(15) Heat-Seal Strength

The heat-seal conditions and the strength measurement conditions are as follows. The polyolefin-based resin film sides of laminates obtained in an example or a comparative example were superimposed on each other, then heat-sealed at a pressure of 0.2 MPa and a heat-seal temperature of 220° C. for 1 second using a seal bar having a width of 10 mm, and then allowed to cool. Test pieces having a size of 80 mm in the longitudinal direction and 15 mm in the lateral direction were cut out from each of the films heat-sealed at different temperatures, and the heat-sealed portion of each of the test pieces was peeled at a cross head speed of 200 mm/min to measure peel strength. As a testing machine, a universal material testing machine 5965 manufactured by Instron was used. The measurement was performed at N=3 times, and the average value was calculated.

(16) Bag Breaking Resistance

The laminate was cut into two sheets, and a four-side sealed bag having an inner size of 170 mm in length and 120 mm in width and containing 300 ml of saturated saline was prepared. The heat-seal conditions at this time were a pressure of 0.2 MPa, a time of 1 second, a width of a seal bar of 10 mm, and a heat-seal temperature of 220° C. After the bag making, the edges of the four-side sealed bag were cut off to adjust a seal width to 5 mm. The four-side sealed bag was retorted at 115° C. for 30 minutes. Next, the four-side sealed bag was left standing in an environment of −5° C. for 8 hours, and under the environment, the bag was dropped on a flat concrete floor from a height of 1.0 m. The dropping was repeated until the bag was broken, the number of repeated dropping was counted, and grades were provided as follows. The number of bags was 20 at each level.
- ⊚: The number of dropping when the residual ratio reaches 50% is 13 or more.
- ○: The number of dropping when the residual ratio reaches 50% is 10 or more and 12 or less.
- Δ: The number of dropping when the residual ratio reaches 50% is 5 or more and 9 or less.
- x: The number of dropping when the residual ratio reaches 50% is 4 or less.

(17) Orientation Angle

The orientation angle (°) of a base film was measured using a molecular orientation analyzer MOA-6004 manufactured by Oji Scientific Instruments Co., Ltd. A sample having a size of 120 mm in the longitudinal direction and 100 mm in the lateral direction was cut out and mounted to the measuring instrument, and a measured value of angle was defined as an orientation angle. It is to be noted that the longitudinal direction is 0°. The measurement was performed at N=3, and the average value was calculated.

Example 1

(Polyolefin-Based Resin Film)

With respect to 100 parts by weight of a propylene-ethylene random copolymer having an MFR of 3.2 g/10 min at 230° C. and 2.16 kg and a melting point of 142° C. (WF577PG manufactured by Sumitomo Chemical Co., Ltd.), 8.3 parts by weight of a ethylene-butene copolymeric elastomer resin having an MFR of 3.6 g/10 min at 190° C. and 2.16 kg (TAFMER A-4070S manufactured by Mitsui Chemicals, Inc.) and 2.8 parts by weight of an propylene-butene copolymeric elastomer resin having an MFR of 3.0 g/10 min at 190° C. and 2.16 kg (TAFMER XM-7070S manufactured by Mitsui Chemicals, Inc.) were prepared. To 100 parts by weight of the adjusted product, erucamide as an organic lubricant was added such that the content thereof was 320 ppm and silica having an average particle diameter of 4 μm as an inorganic anti-blocking agent was added such that the content thereof was 2400 ppm. These raw materials were homogeneously mixed to afford a mixed raw material for producing a polyolefin-based resin film.

(Melt Extrusion)

The mixed raw material to be used for the intermediate layer, the mixed raw material for the laminate layer, and the mixed raw material for the heat-seal layer were introduced by using a three-stage single screw extruder having a screw diameter of 90 mm, a three-stage single screw extruder having a diameter of 45 mm, and a three-stage single screw extruder having a diameter of 65 mm, respectively into a T slot die having a two-stage preland 800 mm in width and designed so as to make a flow in the die uniform by curving the stepped portion to allow a molten resin to flow uniformly, in the order of the laminate layer/the intermediate layer/the heat-seal layer. The mixed raw materials were then extruded through the die at an outlet temperature of 230° C.

The thickness proportions of the laminate layer/the intermediate layer/the heat-seal layer were 25%/50%/25%, respectively. The mixed raw material was put in the same manner into all of the laminate layer, the intermediate layer and the heat-seal layer.
(Cooling)
The molten resin sheet discharged from the die was cooled with a cooling roll at 21° C. to afford an unstretched polyolefin-based resin film having a thickness of 210 μm. At the time of cooling with the cooling roll, both edges of the film on the cooling roll were fixed with air nozzles, the entire width of the molten resin sheet was pressed against the cooling roll with an air knife, and at the same time, a vacuum chamber was operated to prevent air from being entrained between the molten resin sheet and the cooling roll. The air nozzles were installed in series in the direction of forward movement of the film at both the edges. The die was surrounded by a sheet to prevent air from blowing the molten resin sheet.
(Preheating)
The unstretched sheet was led to heated rolls, and the sheet was preheated by bringing the sheet into contact with the rolls. The temperature of the preheating roll was 105° C. Multiple rolls were used to preheat both sides of the film.
(Longitudinal Stretching)
The unstretched sheet was led to a longitudinal stretching machine, and stretched 3.5 times using a roll speed difference to have a thickness of 60 μm. The temperature of the stretching roll was 105° C.
(Annealing Treatment)
Heat treatment was performed at 120° C. with addition of a 5% relaxation ratio using annealing rolls. Multiple rolls were used to heat-treat both sides of the film.
(Corona Treatment)
One surface (the laminate surface) of the film was subjected to corona treatment.
(Winding)
The film was produced at a speed of 20 m/min. The film produced was trimmed at its crust portions and then wound into a roll. The wet tension of the one surface (the laminate surface) of the film was 42 mN/m.
(Preparation of Laminate)
An ester-based adhesive prepared by mixing 33.6 parts by mass of a main agent (TM569 manufactured by Toyo-Morton. Ltd.), 4.0 parts by mass of a curing agent (CAT10L manufactured by Zbyo-Morton, Ltd.) and 62.4 parts by mass of ethyl acetate was applied to a biaxially stretched nylon film manufactured by Toyobo Co., Ltd. (N1102, thickness: 15 μm, orientation angle: 22° with respect to the longitudinal direction) as a base film in an applied amount of 3.0 g/m$^2$, and the polyolefin-based resin films obtained and the base film were dry-laminated. The wound product was kept at 40° C. and aged for 3 days to afford a laminate.

Example 2

A 60 μm-thick polyolefin-based resin film was prepared in the same manner as in Example 1 except that the thickness of the unstretched polyolefin-based resin film was 240 μm, the longitudinal stretch ratio was 4.0 times, and the annealing treatment temperature was 130° C. A laminate was prepared in the same manner as in Example 1.

Example 3

A 60 μm-thick polyolefin-based resin film was prepared in the same manner as in Example 1 except that the thickness of the unstretched polyolefin-based resin film was 270 μm and the longitudinal stretch ratio was 4.5 times. A laminate was prepared in the same manner as in Example 1.

Example 4

A 50 μm-thick polyolefin-based resin film was prepared in the same manner as in Example 1 except that the thickness of the unstretched polyolefin-based resin film was 200 μm and the longitudinal stretch ratio was 4.0 times. A laminate was prepared in the same manner as in Example 1.

Example 5

In Example 2, 8.7 parts by weight of the ethylene-butene copolymeric elastomer resin (TAFMER A-4070S manufactured by Mitsui Chemicals, Inc.) and 7.6 parts by weight of the propylene-butene copolymeric elastomer resin (TAFMER XM-7070S manufactured by Mitsui Chemicals, Inc.) were prepared with respect to 100 parts by weight of the propylene-ethylene random copolymer (WF577PG manufactured by Sumitomo Chemical Co., Ltd.). To 100 parts by weight of the adjusted product, 320 ppm of erucamide as an organic lubricant and 2400 ppm of silica having an average particle diameter of 4 μm as an inorganic anti-blocking agent were added. These raw materials were homogeneously mixed to afford a mixed raw material for producing a polyolefin-based resin film. A 60 μm-thick polyolefin-based resin film was obtained in the same manner as described in Example 2 except that the mixed raw material was used in all of the laminate layer, the intermediate layer and the seal layer, and the annealing temperature was 120° C. A laminate was prepared in the same manner as in Example 1.

Example 6

A 60 μm-thick polyolefin-based resin film was obtained in the same manner as in Example 2 except that the preheating roll temperature was 95° C., the stretching roll temperature was 95° C., and the annealing temperature was 110° C. A laminate was prepared in the same manner as in Example 1.

Comparative Example 1

A 60 μm-thick polyolefin-based resin film was prepared in the same manner as in Example 1 except that the thickness of the unstretched polyolefin-based resin film was 60 μm, and no preheating, no longitudinal stretching and no annealing treatment were performed. A laminate was prepared in the same manner as in Example 1.

Comparative Example 2

A 60 μm-thick polyolefin-based resin film was prepared in the same manner as in Example 2 except that the thickness of the unstretched polyolefin-based resin film was 150 μm, the longitudinal stretch ratio was 2.5 times, and the annealing treatment temperature was 130° C. A laminate was prepared in the same manner as in Example 1.

Comparative Example 3

In Example 3, 4.3 parts by weight of an ethylene-butene copolymeric elastomer resin having an MFR of 1.4 g/10 min at 190° C. and 2.16 kg (TAFMER A-4085S manufactured by Mitsui Chemicals, Inc.) and 4.3 parts by weight of a propylene-butene copolymeric elastomer resin (TAFMER XM-7070S manufactured by Mitsui Chemicals, Inc.) were prepared with respect to 100 parts by weight of a propylene-ethylene block copolymer having a resin density of 891 kg/m$^3$ and an MFR of 3.0 g/10 min at 230° C. and 2.16 kg (WFS5293-22 manufactured by Sumitomo Chemical Co., Ltd.). These raw materials were homogeneously mixed to afford a mixed raw material for producing a polyolefin-based resin film. A 60 μm-thick polyolefin-based resin film was obtained in the same manner as described in Example 3 except that the mixed raw material was used in all of the laminate layer. A laminate was prepared in the same manner as in Example 1.

Comparative Example 4

In Example 2, 2.0 parts by weight of the propylene-butene copolymeric elastomer resin (TAFMER XM-7070S manufactured by Mitsui Chemicals, Inc.) was prepared with respect to 100 parts by weight of the propylene-ethylene random copolymer (WF577PG manufactured by Sumitomo Chemical Co., Ltd.). To 100 parts by weight of the adjusted product, 320 ppm of erucamide as an organic lubricant and 2400 ppm of silica having an average particle diameter of 4 μm as an inorganic anti-blocking agent were added. These raw materials were homogeneously mixed to afford a mixed raw material for producing a polyolefin-based resin film. A 60 μm-thick polyolefin-based resin film was obtained in the same manner as described in Example 2 except that the mixed raw material was used in all of the laminate layer, the intermediate layer and the seal layer, and no annealing treatment was performed. A laminate was prepared in the same manner as in Example 1.

Comparative Example 5

In Example 2, 11.1 parts by weight of the ethylene-butene copolymeric elastomer resin (TAFMER A-4085S manufactured by Mitsui Chemicals, Inc.) was prepared with respect to 100 parts by weight of the propylene-ethylene random copolymer (WF577PG manufactured by Sumitomo Chemical Co., Ltd.). Tb 100 parts by weight of the adjusted product, 320 ppm of erucamide as an organic lubricant and 2400 ppm of silica having an average particle diameter of 4 μm as an inorganic anti-blocking agent were added. These raw materials were homogeneously mixed to afford a mixed raw material for producing a polyolefin-based resin film. A 60 μm-thick polyolefin-based resin film was obtained in the same manner as described above except that the mixed raw materials were used in all of the laminate layer, the intermediate layer, and the seal layer, the thickness of the unstretched polyolefin-based resin film was 258 μm, the longitudinal stretch ratio was 4.3 times, and no annealing treatment was performed. A laminate was prepared in the same manner as in Example 1.

Comparative Example 6

In Example 1, 25.0 parts by weight of the propylene-butene copolymeric elastomer resin (TAFMER XM-7070S manufactured by Mitsui Chemicals, Inc.) was prepared with respect to 100 parts by weight of a propylene-ethylene random copolymer having a ethylene content of 3.2 wt % and an MFR of 2.0 g/min at 230° C. and 2.16 kg. Tb 100 parts by weight of the adjusted product, 320 ppm of erucamide as an organic lubricant and 2400 ppm of silica having an average particle diameter of 4 μm as an inorganic anti-blocking agent were added. These raw materials were homogeneously mixed to afford a mixed raw material for producing a polyolefin-based resin film. The mixed raw material was used in all of the laminate layer, the intermediate layer, and the seal layer. The unstretched polyolefin-based resin film had a thickness of 280 μm, was transversely stretched 7.0 times by a tenter method without using a longitudinal stretching machine, and was subjected to annealing treatment with hot air in the tenter. The temperature conditions of the tenter were a preheating temperature of 105° C., a stretching zone of 105° C., and an annealing zone of 130° C. A 40 μm-thick polyolefin-based resin film was obtained in the same manner as in Example 1 except for the above. A laminate was prepared in the same manner as in Example 1.

Comparative Example 7

In Example 1, for the laminate layer and the intermediate layer, 125 parts by weight of the propylene-ethylene block copolymer (WFS5293-22 manufactured by Sumitomo Chemical Co., Ltd.) and 25 parts by weight of the ethylene-butene copolymeric elastomer resin (TAFMER A-4070S manufactured by Mitsui Chemicals, Inc.) were prepared with respect to 100 parts by weight of a propylene-ethylene-butene random copolymer having an ethylene content of 2.5 mol %, a butene content of 0.8 mol %, and an MFR of 7 g/10 min at 230° C. and 2.16 kg. These raw materials were homogeneously mixed to afford a mixed raw material for constituting the laminate layer and the intermediate layer.

For a heat-seal layer, 50 parts by weight of the propylene-ethylene block copolymer (WFS5293-22 manufactured by Sumitomo Chemical Co., Ltd.) and 16.7 parts by weight of the ethylene-butene copolymeric elastomer resin (TAFMER A-4070S manufactured by Mitsui Chemicals, Inc.) were prepared with respect to 100 parts by weight of a propylene-ethylene-butene random copolymer having an ethylene content of 2.5 mol %, a butene content of 0.8 mol %, and an MFR of 7 g/10 min at 230° C. and 2.16 kg. Tb 100 parts by weight of the adjusted product, 320 ppm of erucamide as an organic lubricant and 2400 ppm of silica having an average particle diameter of 4 μm as an inorganic anti-blocking agent were added in the form of a masterbatch. These raw materials were homogeneously mixed to afford a mixed raw material for constituting the heat-seal layer.

A 60 μm-thick polyolefin-based resin film was obtained in the same manner as in Example 1 except that the mixed raw materials were used as the laminate layer, the intermediate layer and the heat-seal layer, the thickness of the unstretched polyolefin-based resin film was 300 μm, the longitudinal stretch ratio was 5.0, and no annealing treatment was performed. A laminate was prepared in the same manner as in Example 1.

Comparative Example 8

In Example 1, for the laminate layer and the intermediate layer, 1000 ppm of silica having an average particle diameter of 4 μm was added as an inorganic anti-blocking agent as an organic lubricant to 100 parts by weight of a polypropylene homopolymer having an intrinsic viscosity of 2.0 dL/g and a melting point of 163° C. These raw materials were homogeneously mixed to afford a mixed raw material for constituting the laminate layer and the intermediate layer. For the heat-seal layer, a butene-ethylene copolymer having an ethylene content of 4 wt % was prepared with respect to 100 parts by weight of a propylene-butene copolymer having a butene content of 19 wt % and a melting point of 137° C. 3000 ppm of erucamide and 3000 ppm of silica having an average particle diameter of 4 μm as an inorganic anti-blocking agent were added. These raw materials were homogeneously mixed to afford a mixed raw material for constituting the heat-seal layer. The mixed raw materials were used as the laminate layer, the intermediate layer and the heat-seal layer, the ratio of the laminate layer/the intermediate layer/the heat-seal layer was adjusted to 7/15/3, and thus a 125 μm-thick polyolefin-based resin film was formed. A 25 μm-thick polyolefin-based resin film was obtained in the same manner as in Example 1 except that the preheating temperature of longitudinal stretching was 120° C., the stretching temperature was 120° C., the longitudinal stretch ratio was 5.0 times, and the annealing treatment temperature was 140° C. A laminate was prepared in the same manner as in Example 1.

In Comparative Example 1 and Comparative Example 2, since ΔNx was small, the straight cuttability was poor. In addition, the planar orientation coefficient was small, and the piercing strength and the bending pinhole resistance were poor.

In Comparative Example 3, since the block copolymer was used, the transparency (haze) was poor.

In Comparative Example 4, since no annealing treatment was performed, the thermal shrinkage rate was high and the finished quality of the bag was poor. In addition, since no ethylene-butene copolymer was used, the sealability and the bag breaking resistance were poor.

In Comparative Example 5, since no propylene-butene copolymer was used, the bag breaking heat resistance was poor.

In Comparative Example 6, since the stretching direction was transverse stretching, the planar orientation coefficient was small, and the piercing strength, the bending pinhole resistance, and the bag breaking resistance were poor.

In Comparative Example 7, since no annealing treatment was performed, the thermal shrinkage rate was high and the finished quality of the bag was poor. In addition, since the ethylene-butene copolymer was added in a large amount, the transparency (haze) and the blocking resistance were poor.

In Comparative Example 8, since the polypropylene homopolymer was used for the laminate layer and the intermediate layer, the bag breaking resistance was poor, and since the thickness of the heat-seal layer was small, the heat-seal strength was also poor.

The above results are shown in Tables 1 and 2.

TABLE 1

| | | | Example 1 | Example 2 | Example 3 |
|---|---|---|---|---|---|
| Laminate layer | Propylene-ethylene random | | 100 | 100 | 100 |
| + | Propylene-ethylene copolymeric random | | — | — | — |
| Intermediate layer | Ethylene-butene compolymeric elastomer | | 8.3 | 8.3 | 8.3 |
| | Propylene-butene compolymeric elastomer | | 2.8 | 2.8 | 2.8 |
| | Propylene-ethylene block | | — | — | — |
| | Polypropylene homopolymer | | — | — | — |
| Heat-seal layer | Propylene-ethylene random | | 100 | 100 | 100 |
| | Butene-ethylene random | | — | — | — |
| | Propylene-ethylene-butene random | | — | — | — |
| | Propylene-butene random | | — | — | — |
| | Propylene-ethylene-butene random | | — | — | — |
| | Ethylene-butene coplymeric elastomer | | 8.3 | 8.3 | 8.3 |
| | Propylene-butene coplymeric elastomer | | 2.8 | 2.8 | 2.8 |
| | Propylene-ethylene block | | — | — | — |
| | Propylene homopolymer | | — | — | — |
| Thickness | Laminater layer | μm | 15 | 15 | 15 |
| | Intermediate layer | μm | 30 | 30 | 30 |
| | Seal layer | μm | 15 | 15 | 15 |
| Anti-blocking agent | Concentration | ppm | 2400 | 2400 | 2400 |
| | Type + Average particle diameter μm | | Silica 4.0 μm | Silica 4.0 μm | Silica 4.0 μm |
| | Preheating temperature | ° C. | 105 | 105 | 105 |
| | Stretching temperature | ° C. | 105 | 105 | 105 |
| | Stretching direction | — | Longitudinal | Longitudinal | Longitudinal |
| | Stretch rato | time | 3.5 | 4.0 | 4.5 |
| | Annealing treatment | ° C. | 120 | 130 | 120 |
| | Thickness | μm | 60 | 60 | 50 |
| | Haze | % | 15.3 | 20.4 | 25.8 |
| Friction coefficient | Non-treated surfaces | — | 0.19 | 0.19 | 0.18 |
| Tear strength | Longitudinal direction | N | 0.45 | 0.38 | 0.33 |
| Tear strength | Lateral direction | V | 9.5 | 8.1 | 7.8 |
| | Piercing strength | N | 6.9 | 7.1 | 7.5 |
| Piercing strength | Per 1 μm | N/μm | 0.12 | 0.12 | 0.13 |
| Accelerated blocking | MD | mN/70 mm | 313 | 309 | 356 |
| Martera hardness | Seal surface | N/mm2 | 75 | 88 | 93 |
| Indentation creep rate(cit) | Seal surface | % | 2.8 | 2.7 | 2.6 |
| X axis orientation | ΔNx | — | 0.0210 | 0.0228 | 0.0238 |
| Planar orientationoenstios | ΔP | — | 0.0105 | 0.0116 | 0.0129 |
| | Melting point | ° C. | 139 | 140 | 144 |
| Gebo pinhole | 1° C. 1000 times | Number | 4 | 2 | 0 |
| Thermal shrinkage rare | Longitudinal direction | % | 16.4 | 18.5 | 23.1 |
| 120° C. 30 min | Lateral direction | % | −1.9 | −2 | −2.4 |
| Wet tension | Corona treated surtace | mN/m | 42 | 42 | 42 |

TABLE 1-continued

| | | | | | |
|---|---|---|---|---|---|
| Finished quality of bag※ | — | — | ○ | ○ | ○ |
| Hest-seal strength※ | Longitudinal direction | N/15 mm | 51 | 50 | 50 |
| | Piercing strength※ | N | 22.3 | 23.9 | 24.4 |
| Tear strength※ | Longitudinal direction | N | 0.95 | 0.89 | 0.71 |
| Tear strength※※ | Lateral direction | N | unmeasureable* | unmeasureable* | unmeasureable* |
| Straight effability Tear strength※ | Stretching direction | mm | 8 | 5 | 1 |
| Parting Tear strength※ | Stretching direction | mm | 6 | 3 | 1 |
| | Bag breaking resistance※ | — | ○ | ○ | ○ |

| | | | Example 4 | Example 5 | Example 6 |
|---|---|---|---|---|---|
| Laminate layer | Propylene-ethylene random | | 100 | 100 | 100 |
| + | Propylene-ethylene copolymeric random | | — | — | — |
| Intermediate layer | Ethylene-butene compolymeric elastomer | | 8.3 | 8.7 | 8.3 |
| | Propylene-butene compolymeric elastomer | | 2.8 | 7.6 | 2.8 |
| | Propylene-ethylene block | | — | — | — |
| | Polypropylene homopolymer | | — | — | — |
| Heat-seal layer | Propylene-ethylene random | | 100 | 100 | 100 |
| | Butene-ethylene random | | — | — | — |
| | Propylene-ethylene-butene random | | — | — | — |
| | Propylene-butene random | | — | — | — |
| | Propylene-ethylene-butene random | | — | — | — |
| | Ethylene-butene coplymeric elastomer | | 8.3 | 8.7 | 8.3 |
| | Propylene-butene coplymeric elastomer | | 2.8 | 7.6 | 2.8 |
| | Propylene-ethylene block | | — | — | — |
| | Propylene homopolymer | | — | — | — |
| Thickness | Laminater layer | μm | 13 | 15 | 15 |
| | Intermediate layer | μm | 25 | 30 | 30 |
| | Seal layer | μm | 12 | 15 | 15 |
| Anti-blocking agent | Concentration | ppm | 2400 | 2400 | 2400 |
| | Type + Average particle diameter | μm | Silica 4.0 μm | Silica 4.0 μm | Silica 4.0 μm |
| | Preheating temperature | °C. | 105 | 105 | 95 |
| | Stretching temperature | °C. | 105 | 105 | 95 |
| | Stretching direction | — | Longitudinal | Longitudinal | Longitudinal |
| | Stretch rato | time | 4.0 | 4.0 | 4.0 |
| | Annealing treatment | °C. | 120 | 120 | 110 |
| | Thickness | μm | 50 | 60 | 60 |
| | Haze | % | 18.4 | 20.1 | 20.8 |
| Friction coefficient | Non-treated surfaces | — | 0.20 | 0.20 | 0.19 |
| Tear strength | Longitudinal direction | N | 0.27 | 0.51 | 0.39 |
| Tear strength | Lateral direction | V | 6.4 | 10.3 | 8.2 |
| Piercing strength | N | | 6.6 | 7.1 | 7.3 |
| Piercing strength | Per 1 μm | N/μm | 0.13 | 0.12 | 0.12 |
| Accelerated blocking | MD | mN/70 mm | 284 | 366 | 316 |
| Martera hardness | Seal surface | N/mm2 | 90 | 71 | 89 |
| Indentation creep rate(cit) | Seal surface | % | 2.8 | 2.6 | 2.8 |
| X axis orientation | ΔNx | — | 0.0227 | 0.0230 | 0.0229 |
| Planar orientationoenstios | ΔP | — | 0.0116 | 0.0121 | 0.0118 |
| | Melting point | °C. | 140 | 139 | 140 |
| Gebo pinhole | 1°C. 1000 times | Number | 1 | 2 | 1 |
| Thermal shrinkage rare | Longitudinal direction | % | 18.6 | 24.1 | 21.3 |
| 120°C. 30 min | Lateral direction | % | -2.2 | -2.5 | -2.2 |
| Wet tension | Corona treated surtace | mN/m | 42 | 42 | 42 |
| Finished quality of bag※ | — | — | ○ | ○ | ○ |
| Hest-seal strength※ | Longitudinal direction | N/15 mm | 42 | 51 | 49 |
| Piercing strength※ | N | | 21.9 | 24.0 | 23.7 |
| Tear strength※ | Longitudinal direction | N | 0.88 | 0.93 | 0.88 |
| Tear strength※※ | Lateral direction | N | unmeasureable* | unmeasureable* | unmeasureable* |
| Straight effability Tear strength※ | Stretching direction | mm | 5 | 8 | 6 |
| Parting Tear strength※ | Stretching direction | mm | 3 | 4 | 3 |
| | Bag breaking resistance※ | — | ○ | ○ | ○ |

※represents the evaluation of the laminate,
※※unmeasurable* indicates that the film was torn in the stretching direction during the evaluation of characteristics and no measurement value was obtained.

TABLE 2

| | | Example 1 | Example 2 | Example 3 |
|---|---|---|---|---|
| Laminate layer | Propylene-ethylene random | 100 | 100 | 100 |
| + | Propylene-ethylene copolymeric random | — | — | — |
| Intermediate layer | Ethylene-butene compolymeric elastomer | 8.3 | 8.3 | 8.3 |
| | Propylene-butene compolymeric elastomer | 2.8 | 2.8 | 2.8 |
| | Propylene-ethylene block | — | — | — |
| | Polypropylene homopolymer | — | — | — |

TABLE 2-continued

| | | | | | |
|---|---|---|---|---|---|
| Heat-seal layer | Propylene-ethylene random | | 100 | 100 | 100 |
| | Butene-ethylene random | | — | — | — |
| | Propylene-ethylene-butene random | | — | — | — |
| | Propylene-butene random | | — | — | — |
| | Propylene-ethylene-butene random | | — | — | — |
| | Ethylene-butene coplymeric elastomer | | 8.3 | 8.3 | 8.3 |
| | Propylene-butene coplymeric elastomer | | 2.8 | 2.8 | 2.8 |
| | Propylene-ethylene block | | — | — | — |
| | Propylene homopolymer | | — | — | — |
| Thickness | Laminater layer | μm | 15 | 15 | 15 |
| | Intermediate layer | μm | 30 | 30 | 30 |
| | Seal layer | μm | 15 | 15 | 15 |
| Anti-blocking agent | Concentration | ppm | 2400 | 2400 | 2400 |
| | Type + Average particle diameter | μm | Silica 4.0 μm | Silica 4.0 μm | Silica 4.0 μm |
| Preheating temperature | | °C. | 105 | 105 | 105 |
| Stretching temperature | | °C. | 105 | 105 | 105 |
| Stretching direction | | — | Longitudinal | Longitudinal | Longitudinal |
| Stretch rato | | time | 3.5 | 4.0 | 4.5 |
| Annealing treatment | | °C. | 120 | 130 | 120 |
| Thickness | | μm | 60 | 60 | 50 |
| Haze | | % | 15.3 | 20.4 | 25.8 |
| Friction coefficient | Non-treated surfaces | — | 0.19 | 0.19 | 0.18 |
| Tear strength | Longitudinal direction | N | 0.45 | 0.38 | 0.33 |
| Tear strength | Lateral direction | V | 9.5 | 8.1 | 7.8 |
| Piercing strength | | N | 6.9 | 7.1 | 7.5 |
| Piercing strength | Per 1 μm | N/μm | 0.12 | 0.12 | 0.13 |
| Accelerated blocking | MD | mN/70 mm | 313 | 309 | 356 |
| Martera hardness | Seal surface | N/mm2 | 75 | 88 | 93 |
| Indentation creep rate(cit) | Seal surface | % | 2.8 | 2.7 | 2.6 |
| X axis orientation | ΔNx | — | 0.0210 | 0.0228 | 0.0238 |
| Planar orientationoenstios | ΔP | — | 0.0105 | 0.0116 | 0.0129 |
| Melting point | | °C. | 139 | 140 | 144 |
| Gebo pinhole | 1° C. 1000 times | Number | 4 | 2 | 0 |
| Thermal shrinkage rare | Longitudinal direction | % | 16.4 | 18.5 | 23.1 |
| 120° C. 30 min | Lateral direction | % | −1.9 | −2 | −2.4 |
| Wet tension | Corona treated surtace | mN/m | 42 | 42 | 42 |
| Finished quality of bag·X· | — | — | ○ | ○ | ○ |
| Hest-seal strength·X· | Longitudinal direction | N/15 mm | 51 | 50 | 50 |
| Piercing strength·X· | | N | 22.3 | 23.9 | 24.4 |
| Tear strength·X· | Longitudinal direction | N | 0.95 | 0.89 | 0.71 |
| Tear strength·X· | Lateral direction | N | unmeasureable* | unmeasureable* | unmeasureable* |
| Straight effability·X· | Stretching direction | mm | 8 | 5 | 1 |
| PartingTear strength·X· | Stretching direction | mm | 6 | 3 | 1 |
| Bag breaking resistance·X· | | — | ○ | ○ | ○ |

| | | | Example 4 | Example 5 | Example 6 |
|---|---|---|---|---|---|
| Laminate layer | Propylene-ethylene random | | 100 | 100 | 100 |
| + | Propylene-ethylene copolymeric random | | — | — | — |
| Intermediate layer | Ethylene-butene compolymeric elastomer | | 8.3 | 8.7 | 8.3 |
| | Propylene-butene compolymeric elastomer | | 2.8 | 7.6 | 2.8 |
| | Propylene-ethylene block | | — | — | — |
| | Polypropylene homopolymer | | — | — | — |
| Heat-seal layer | Propylene-ethylene random | | 100 | 100 | 100 |
| | Butene-ethylene random | | — | — | — |
| | Propylene-ethylene-butene random | | — | — | — |
| | Propylene-butene random | | — | — | — |
| | Propylene-ethylene-butene random | | — | — | — |
| | Ethylene-butene coplymeric elastomer | | 8.3 | 8.7 | 8.3 |
| | Propylene-butene coplymeric elastomer | | 2.8 | 7.6 | 2.8 |
| | Propylene-ethylene block | | — | — | — |
| | Propylene homopolymer | | — | — | — |
| Thickness | Laminater layer | μm | 13 | 15 | 15 |
| | Intermediate layer | μm | 25 | 30 | 30 |
| | Seal layer | μm | 12 | 15 | 15 |
| Anti-blocking agent | Concentration | ppm | 2400 | 2400 | 2400 |
| | Type + Average particle diameter | μm | Silica 4.0 μm | Silica 4.0 μm | Silica 4.0 μm |
| Preheating temperature | | °C. | 105 | 105 | 95 |
| Stretching temperature | | °C. | 105 | 105 | 95 |
| Stretching direction | | — | Longitudinal | Longitudinal | Longitudinal |
| Stretch rato | | time | 4.0 | 4.0 | 4.0 |
| Annealing treatment | | °C. | 120 | 120 | 110 |
| Thickness | | μm | 50 | 60 | 60 |
| Haze | | % | 18.4 | 20.1 | 20.8 |
| Friction coefficient | Non-treated surfaces | — | 0.20 | 0.20 | 0.19 |
| Tear strength | Longitudinal direction | N | 0.27 | 0.51 | 0.39 |
| Tear strength | Lateral direction | V | 6.4 | 10.3 | 8.2 |

TABLE 2-continued

| | | | | | |
|---|---|---|---|---|---|
| Piercing strength | N | | 6.6 | 7.1 | 7.3 |
| Piercing strength | Per 1 μm | N/μm | 0.13 | 0.12 | 0.12 |
| Accelerated blocking | MD | mN/70 mm | 284 | 366 | 316 |
| Martens hardness | Seal surface | N/mm2 | 90 | 71 | 89 |
| Indentation creep rate(cit) | Seal surface | % | 2.8 | 2.6 | 2.8 |
| X axis orientation | ΔNx | — | 0.0227 | 0.0230 | 0.0229 |
| Planar orientationoenstios | ΔP | — | 0.0116 | 0.0121 | 0.0118 |
| Melting point | | ° C. | 140 | 139 | 140 |
| Gebo pinhole | 1° C. 1000 times | Number | 1 | 2 | 1 |
| Thermal shrinkage rare | Longitudinal direction | % | 18.6 | 24.1 | 21.3 |
| 120° C. 30 min | Lateral direction | % | −2.2 | −2.5 | −2.2 |
| Wet tension | Corona treated surtace | mN/m | 42 | 42 | 42 |
| Finished quality of bag※ | — | | ○ | ○ | ○ |
| Hest-seal strength※ | Longitudinal direction | N/15 mm | 42 | 51 | 49 |
| Piercing strength※ | N | | 21.9 | 24.0 | 23.7 |
| Tear strength※ | Longitudinal direction | N | 0.88 | 0.93 | 0.88 |
| Tear strength※ | Lateral direction | N | unmeasureable* | unmeasureable* | unmeasureable* |
| Straight effability※ | Stretching direction | mm | 5 | 8 | 6 |
| PartingTear strength※ | Stretching direction | mm | 3 | 4 | 3 |
| Bag breaking resistance※ | — | | ○ | ○ | ○ |

※ represents the evaluation of the laminate,
※·※· unmeasurable* indicates that hte film was torn in the stretching direction during the evaluation of characteristics and no measurement value was obtained.

The evaluation result expressed by "unmeasurable*" in Tables 1 and 2 indicates that the film was torn in the stretching direction during the evaluation of characteristics and no measurement value was obtained.

INDUSTRIAL APPLICABILITY

According to the present invention, it is possible to provide a package which is superior in transparency, sealability, bag-forming property, and bag breaking resistance and which is easily torn without parting. Therefore, the present invention can greatly contribute to the industry.

The invention claimed is:

1. A polyolefin-based resin film comprising a polyolefin-based resin composition, wherein the polyolefin-based resin composition comprises a propylene-α olefin random copolymer, an ethylene-butene copolymeric elastomer, and a propylene-butene copolymeric elastomer, and the following 1) to 3) are satisfied:
   1) The polyolefin-based resin composition contains 2 to 9 parts by weight of the ethylene-butene copolymeric elastomer and 2 to 9 parts by weight of the propylene-butene copolymeric elastomer based on 100 parts by weight of the propylene-α olefin random copolymer;
   2) The polyolefin-based resin film exhibits a thermal shrinkage rate after heating at 120° C. for 30 minutes of 25% or less in a direction in which the thermal shrinkage rate after heating at 120° C. for 30 minutes is larger between a longitudinal direction and a lateral direction of the polyolefin-based resin film; and
   3) A planar orientation coefficient ΔP calculated from a refractive index of the polyolefin-based resin film is 0.0100 or more and 0.0145 or less.

2. The polyolefin-based resin film according to claim 1, wherein at least one surface of the polyolefin-based resin film has a Martens hardness of 70 N/15 mm or more and an indentation creep rate (Cit) of 3.0% or less.

3. The polyolefin-based resin film according to claim 1, wherein the polyolefin-based resin film has a haze of 3% or more and 35% or less.

4. The polyolefin-based resin film according to claim 1, wherein the polyolefin-based resin film has a tear strength of 0.5 N or less in a direction in which the thermal shrinkage rate after heating at 120° C. for 30 minutes is larger between the longitudinal direction and the lateral direction of the polyolefin-based resin film.

5. The polyolefin-based resin film according to claim 1, wherein the polyolefin-based resin film has a piercing strength of 0.12 N/μm or more.

6. The polyolefin-based resin film according to claim 1, wherein a layer located on at least one surface of the polyolefin-based resin film has an anti-blocking agent concentration of 3000 ppm or less.

7. A laminate comprising:
   the polyolefin-based resin film according to claim 1; and
   a biaxially oriented film made of at least one polymer selected from the group consisting of a polyamide resin film, a polyester resin film, and a polypropylene resin film.

8. The laminate according to claim 7, wherein the laminate has a straight cuttability of 10 mm or less in a direction in which the thermal shrinkage rate after heating at 120° C. for 30 minutes is larger between a longitudinal direction and a lateral direction of the laminate, and has a tear strength of 1.0 N or less in a direction in which the thermal shrinkage rate after heating at 120° C. for 30 minutes is larger between the longitudinal direction and the lateral direction.

9. A package comprising the laminate according to claim 7.

* * * * *